United States Patent
Shirataki et al.

[19]

[11] Patent Number: 6,082,511
[45] Date of Patent: Jul. 4, 2000

[54] OUTER RING FOR ONE-WAY CLUTCH

[75] Inventors: Hirobumi Shirataki; Kazuhiko Muramatsu, both of Shizuoka-ken, Japan

[73] Assignee: NSK-Warner K.K., Japan

[21] Appl. No.: 09/281,471

[22] Filed: Mar. 30, 1999

[30] Foreign Application Priority Data

Mar. 30, 1998 [JP] Japan ................................. 10-123844

[51] Int. Cl.[7] .......................... F16D 11/06; F16C 33/00
[52] U.S. Cl. ..................... 192/41 R; 192/41 A; 384/625
[58] Field of Search .................... 192/41 R, 45, 192/45.1, 41 A; 384/625, 569

[56] References Cited

U.S. PATENT DOCUMENTS

| 5,397,188 | 3/1995 | Yoshizuka et al. ................. 384/625 |
| 5,415,258 | 5/1995 | Numata ............................. 192/41 A |
| 5,727,317 | 3/1998 | Bekku et al. ..................... 384/625 |

*Primary Examiner*—Charles A. Marmor
*Assistant Examiner*—Tisha D. Waddell
*Attorney, Agent, or Firm*—Evenson, McKeown, Edwards & Lenahan, P.L.L.C.

[57] ABSTRACT

An outer ring for a one-way clutch comprises a heat-treated portion a depth of which varies in a direction of a central axis of the outer ring. The heat-treated portion may be located at a raceway surface for torque transmitting members such as sprags.

5 Claims, 6 Drawing Sheets

OUTER RING FOR ONE-WAY CLUTCH

BACKGROUND OF THE INVENTION a) Field of the Invention

This invention relates to an outer ring for a one-way clutch which is suitable for use with a hub of a wet-type multiple disk clutch useful in an automatic transmission or which is suitable for use in a conveyor or the like.

b) Description of the Related Art

To facilitate understanding of the present invention, an illustrative construction of a clutch pack composed in combination of a one-way clutch and a friction clutch is shown in section in FIG. 5, which shows: a one-way clutch 10, a friction clutch 20 for establishing engagement or disengagement between an inner ring 1 of the one-way clutch and a counterpart member 15, sprags 2, an outer ring 3, splines 4 of the outer ring 3, splines 5 of the counterpart member 15. a snap ring 6, a packing plate 7, friction plates 8, separator plates 9, a clutch-operating piston 11, O-rings 12, a return spring 13 for the piston 11, and a spring seat 14.

When the friction clutch 20 is engaged by extending the piston 11, rotation of the inner ring 1 only in a specific direction is transmitted to the counterpart member 15 via the one-way clutch 10.

FIG. 6 is a front view of a one-way clutch 10 with the inner ring 1 and the outer ring 3 assembled together, and FIG. 7 is a cross-sectional view taken in the direction of arrows VII—VII of FIG. 6. These drawings illustrate the inner ring 1, the sprags 2, the outer ring 3, the splines 4, cages 31, end bearings 32, a ribbon spring 33.

In a one-way clutch, an inner circumferential wall of an outer ring, with which sprags are brought into contact upon transmission of a torque, in other words, a raceway surface for the torque transmitting members has been subjected to hardening in order to increase its strength. FIG. 8 depicts the state of conventional hardening. As is readily appreciated from FIG. 8, it has been the conventional practice to apply hardening to a uniform depth in an inner circumferential wall of an outer ring, in other words, in a raceway surface for torque transmitting members. Numeral 41 indicates a hardened portion. In FIG. 8, those parts of the one-way clutch which are the same as or equivalent to corresponding parts in FIGS. 6 and 7 are shown by the same reference numerals. Accordingly, FIG. 8 shows the one-way clutch 10, the inner ring 1, the sprags 2, the outer ring 3, the splines 4, the cages 31, the end bearings 32, the ribbon spring 33, and retainer plates 34.

For this heat treatment, i.e., hardening, induction hardening has been applied, for example.

The application of heat treatment to an inner circumferential wall of an outer ring as described above is an effective method from the standpoint that the inner circumferential wall, namely, a raceway surface for torque transmitting members such as sprags be protected from wearing. The outer ring is however configured such that a main body, which comprises the raceway surface for the torque transmitting members and a base portion for a outer ring mounting part 35, and the outer ring mounting part 35 are different in thickness in the direction of an axis of the outer ring 3 and, moreover, the outer ring mounting part 35 is asymmetrical with respect to a perpendicular (a line X–X' in FIG. 8) to the axis as viewed in a cross-section taken in the direction of the axis of the outer ring, said perpendicular extending through a center of the axis of the outer ring. When a stress is applied during use, the outer ring mounting part 35 undergoes greater deformation on a first side (a side A in FIG. 8) of the perpendicular X–X' than on a second side (a side B in FIG. 8) of the same perpendicular X–X' because the outer ring mounting part 35 is smaller in thickness on the first side (i.e., the side A) than on the second side (i.e., the side B). Through repeated use, stress concentrates on the first side (i.e., the side A) as is shown in FIG. 9. The outer ring 3 is hence deformed and is eventually broken. This leads to the inconvenience that the service life of the outer ring is shortened.

SUMMARY OF THE INVENTION

An object of the present invention is to solve the above-described drawbacks of the conventional art, and specifically to provide an outer ring for a one-way clutch, which can prevent concentration of stress on a base portion for an outer ring mounting part and hence can avoid premature breakage of the outer ring.

To achieve the above-described object, the present inventors have proceeded with extensive research. As a result, the present inventors have found that the above-described object can be achieved by applying heat treatment to a raceway surface for torque transmitting members to a greater depth on a side of the above-described perpendicular X–X' where the outer ring mounting part has a smaller thickness than the same outer ring mounting part on the opposite side of the perpendicular X–X', or by applying heat treatment to the base portion on the side of the perpendicular X–X', where the outer ring mounting part has the smaller thickness, while also applying heat treatment to a uniform depth to the raceway surface.

In one aspect of the present invention, there is thus provided an outer ring for a one-way clutch, which comprises a heat-treated portion a depth of which varies in a direction of a central axis thereof. The heat-treated portion may be located at a raceway surface for torque transmitting members.

The outer ring may comprise an outer ring mounting part and a main body, said main body being provided with a raceway surface for torque transmitting members and also with a base portion to which the outer ring mounting part is integrally connected. The outer ring mounting part and the main body may be different in thickness from each other in the direction of the central axis of the outer ring. The outer ring mounting part may be asymmetrical with respect to a perpendicular to the central axis of the outer ring, said perpendicular extending through a center of the axis of the outer ring. The raceway surface and the base portion may have been subjected to heat treatment. A depth of the heat treatment to which the base portion has been subjected varies in the direction of the central axis of the outer ring.

The outer ring may comprise an outer ring mounting part and a main body, said main body being provided with a raceway surface for torque transmitting members and also with a base portion to which the outer ring mounting part is integrally connected. The outer ring mounting part and the main body are different in thickness from each other in the direction of the central axis of the outer ring. The outer ring mounting part may be asymmetrical with respect to a perpendicular to the central axis of the outer ring, said perpendicular extending through a center of the central axis of the outer ring. The main body may have been subjected to heat treatment to a greater depth on a first side of the perpendicular than on a second side of the perpendicular, said outer ring mounting part having a smaller thickness in the direction of the central axis on the first side than on the second side.

The heat-treated portion may have been formed by induction hardening.

Owing to the application of heat treatment to varied depths to the raceway surface for the torque transmitting members or to the base portion for the outer ring mounting part, the outer ring according to the present invention for the one-way clutch can avoid concentration of stress on the base portion and eventual breakage, thereby making it possible to provide the one-way clutch with prolonged service life.

DETAILED DESCRIPTION OF THE INVENTION AND PREFERRED EMBODIMENTS

Figure 1:
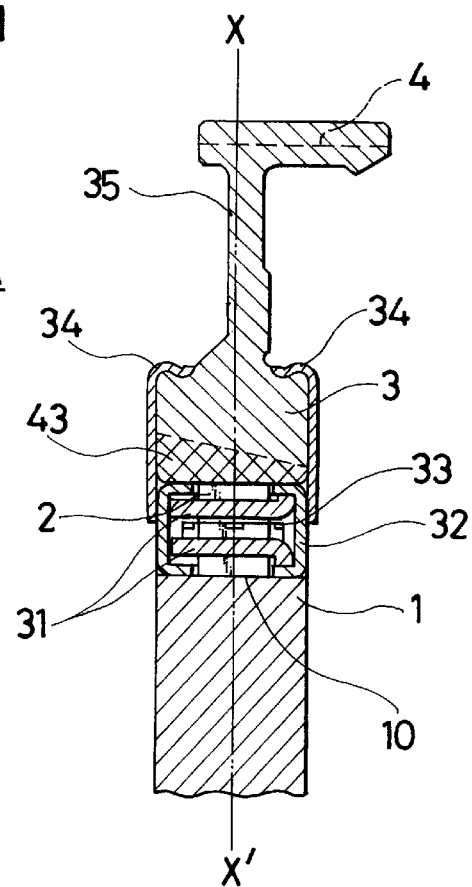
FIG. 1 is a fragmentary axial cross-sectional view of an outer ring according to a first embodiment of the present invention as assembled in a one-way clutch.
Figure 8:
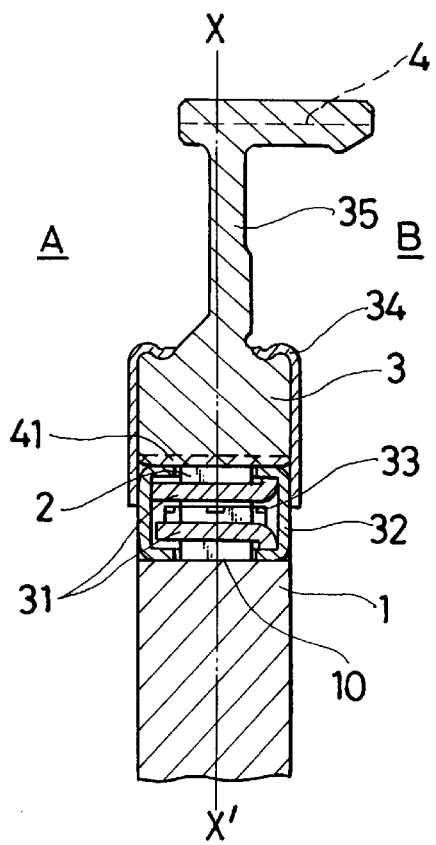
FIG. 8 is a fragmentary axial cross-sectional view of a conventional outer ring, showing the state of hardening.
Figure 9:
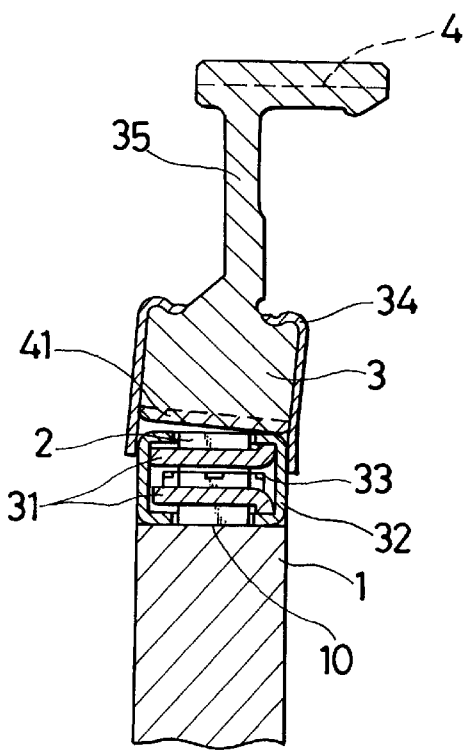
FIG. 9 is similar to FIG. 8, but depicts the conventional outer ring in a broken state.

The outer ring according to the first embodiment of the present invention will now be described with reference to FIG. 1, in which those parts of the outer ring which are the same as or equivalent to corresponding parts in FIG. 8 are shown by the same reference numerals. The depth of a heat-treated portion 43 in a raceway surface (i.e., an inner circumferential wall of the outer ring 3) for torque transmitting members, said heat-treated portion having been formed, for example, by induction hardening, is greater on a side of a perpendicular X–X' to a central axis of the outer ring (i.e., on a side A as viewed in the drawing), where the outer ring mounting part 35 has a smaller thickness than the same outer ring mounting part 35 on the opposite side of the perpendicular X–X'. In other words, the heat treatment has been applied to a greater depth to the inner circumferential wall of the outer ring on the side A as viewed in the drawing).

Figure 2:
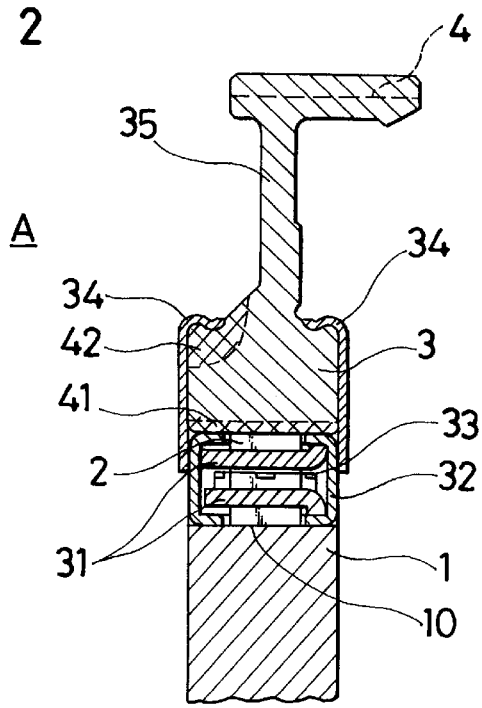
FIG. 2 is a fragmentary axial cross-sectional view of an outer ring according to a second embodiment of the present invention as assembled in a one-way clutch.

Reference is next made to FIG. 2 which illustrates the outer ring according to the second embodiment of the present invention. Heat treatment has been applied to a uniform depth to an inner circumferential wall of the outer ring 3, so that a heat-treated portion 41 of the uniform depth is formed there. In addition, heat treatment has also been applied to a base portion for an outer ring mounting part 35 only on a side A where the outer ring mounting part 35 has a smaller thickness than the same outer ring mounting part 35 on the opposite side.

Figure 3:
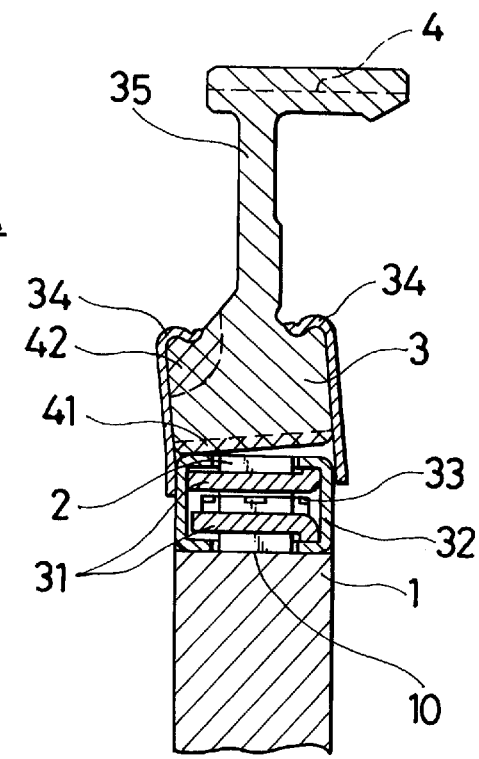
FIG. 3 is similar to FIG. 2, but illustrates the state of the outer ring during idling.
Figure 4:
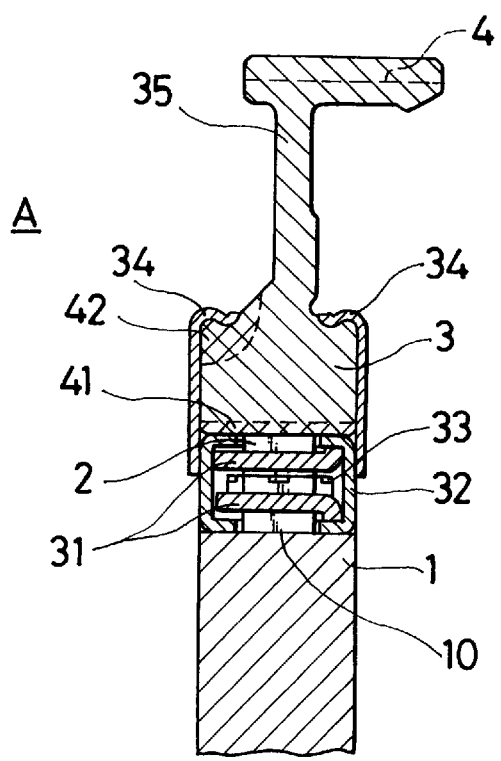
FIG. 4 is similar to FIGS. 2 and 3, but illustrates the state of the outer ring during its engagement with a counterpart member.
Figure 5:
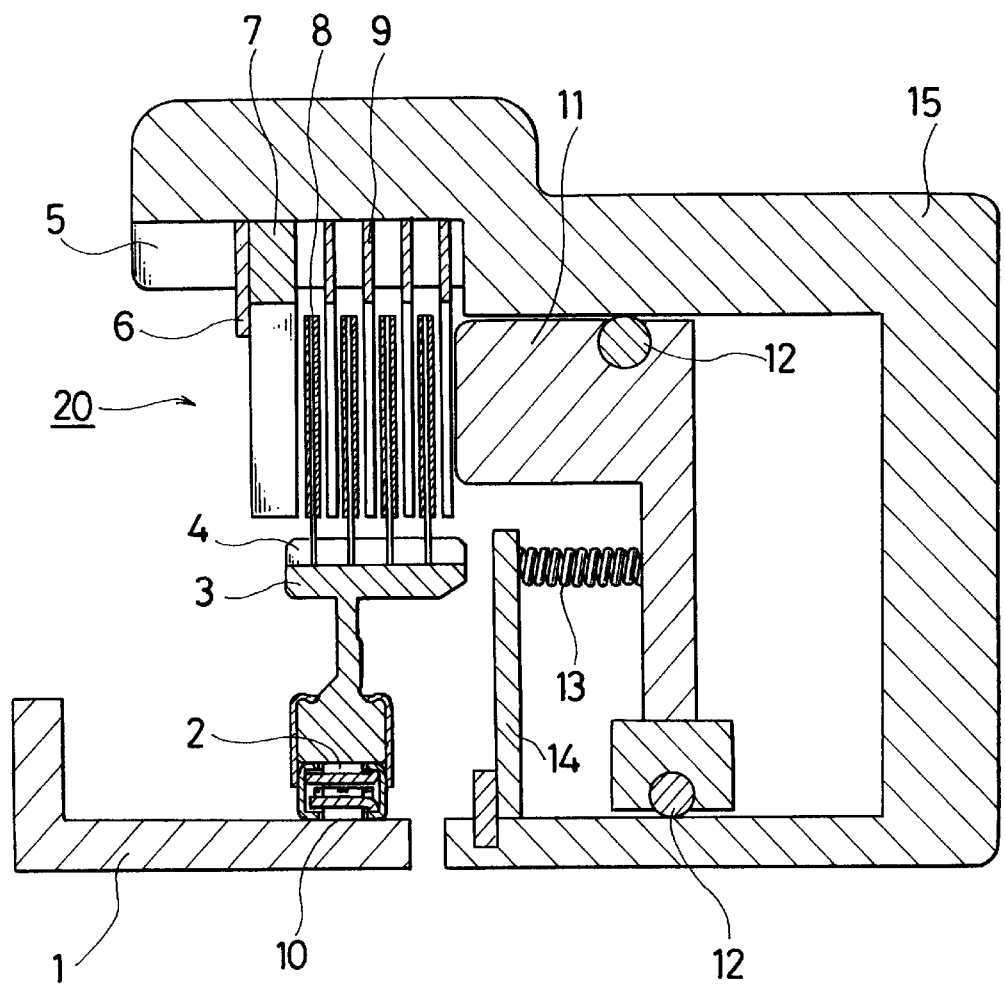
FIG. 5 is a simplified axial cross-sectional view of a clutch pack.
Figure 6:
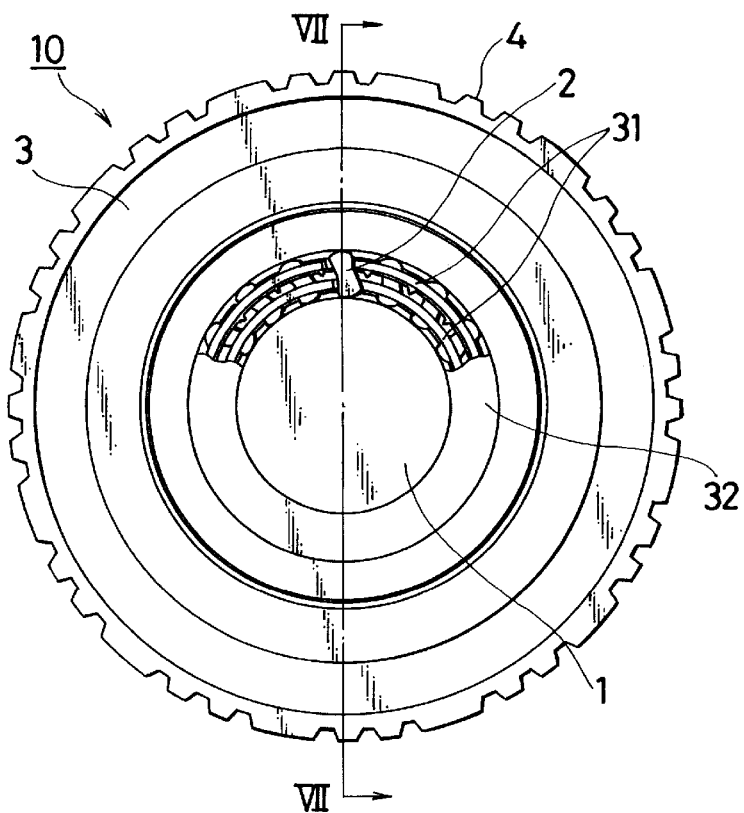
FIG. 6 is a front view of a one-way clutch with an inner ring and an outer ring assembled therein.
Figure 7:
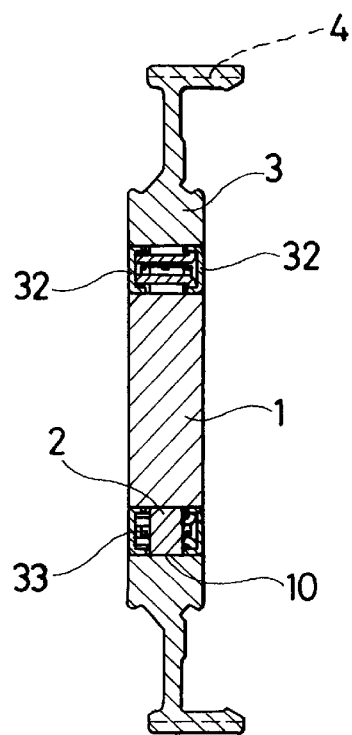
FIG. 7 is a cross-sectional view of the one-way clutch taken in the direction of arrows VII—VII of FIG. 6.

Based on the outer ring 3 according to the second embodiment of the present invention, its operation will next be described. As the heat treatment has been applied to the greater thickness on the side A where the outer ring mounting part 35 has the smaller thickness than the same outer ring mounting part 35 on the opposite side, slight plastic deformation occurs on the outer ring 3 as shown in FIG. 3 through repeated use. Although such plastic deformation remains during idling of the outer ring, the outer ring 3 undergoes elastic deformation as shown in FIG. 4 when the one-way clutch is caused to engage. As a consequence, the outer ring 3 is still allowed to operate while maintaining balance.

Figure 10:
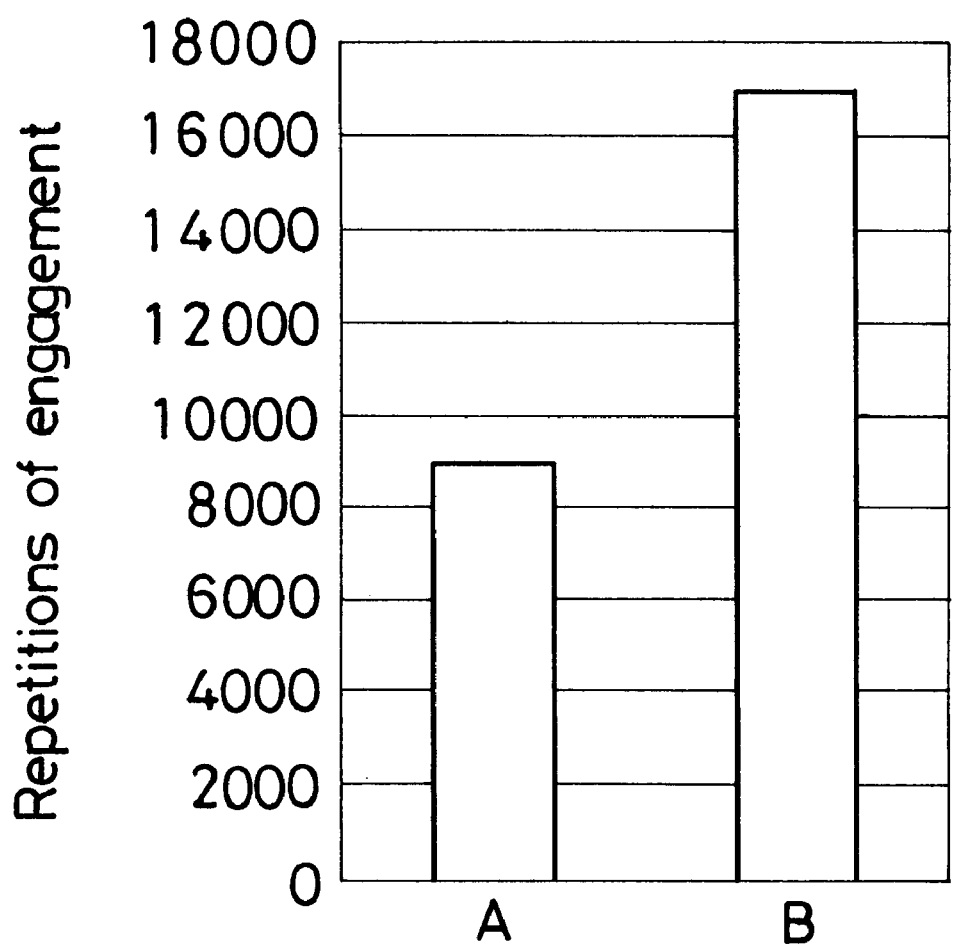
FIG. 10 is a diagram showing the service life of the outer ring according to the second embodiment of the present invention in comparison with that of the conventional outer ring.

The outer ring 3 is therefore assured to have long service life without the problem that as in the conventional outer ring, stress is concentrated on a part of the base portion to result in breakage. FIG. 10 diagrammatically illustrates the results of a comparison test in service life, in which A represents the conventional outer ring while B represents the outer ring according to the second embodiment of the present invention. It is readily understood from the diagram that the service life of the outer ring according to the second embodiment of the present invention has been improved by as much as about 53% over that of the conventional outer ring.

Incidentally, the outer ring shown in FIGS. 3 and 4 is the same as the outer ring according to the second embodiment of the present invention depicted in FIG. 2. It is to be noted that the outer ring according to the first embodiment of the present invention illustrated in FIG. 1 also operates in much the same way as the outer ring according to the second embodiment and can bring about similar advantageous effects.

This application claims the priority of Japanese Patent Application No. HEI 10-123844 filed Mar. 30, 1998, which is incorporated herein by reference.

What is claimed is:

1. An outer ring for a one-way clutch, comprising an outer ring mounting part and a main body, said main body including a raceway surface for torque transmitting members and a base portion integrally connected with said outer ring mounting part, and wherein said outer ring mounting part and said main body are different in thickness from each other in a direction of a central axis of said outer ring;

wherein said outer ring mounting part is asymmetrical with respect to a perpendicular to said central axis of said outer ring with said perpendicular extending through a center of said axis of said outer ring, said base portion further including a heat-treated portion, a depth of which varies in a direction of said central axis of said outer ring.

2. The outer ring according to claim 1, wherein said heat-treated portion is located at a raceway surface for torque transmitting members.

3. The outer ring according to claim 1, wherein:

said raceway surface and said base portion have been subjected to heat treatment; and a depth of said heat treatment to which said base portion has been subjected varies in said direction of said central axis of said outer ring.

4. The outer ring according to claim 1, wherein:

said main body has been subjected to heat treatment to a greater depth on a first side of said perpendicular than on a second side of said perpendicular, said outer ring mounting part having a smaller thickness in said direction of said central axis on said first side than on said second side.

5. The outer ring according to claim 1, wherein said heat-treated portion has been formed by induction hardening.

* * * * *